(12) United States Patent
Baumgartner (10) Patent No.: US 7,774,090 B2
(45) Date of Patent: Aug. 10, 2010

(54) TOOL SELECTION SYSTEM AND METHOD

(75) Inventor: Alan Baumgartner, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 11/531,429

(22) Filed: Sep. 13, 2006

(65) Prior Publication Data

US 2008/0065258 A1    Mar. 13, 2008

(51) Int. Cl.
G06F 19/00    (2006.01)
(52) U.S. Cl. .................. 700/179; 700/95; 700/106; 700/180
(58) Field of Classification Search ............ 700/159, 700/169, 173, 174, 179, 180, 182, 95, 96, 700/98, 99, 103, 97, 100, 106; 318/568.1, 318/568.25
See application file for complete search history.

(56) References Cited

U.S. PATENT DOCUMENTS

| | | | |
|---|---|---|---|
| 6,105,520 A | 8/2000 | Frazer et al. | |
| 6,107,768 A * | 8/2000 | Ouchi et al. | 318/568.25 |
| 6,236,901 B1 * | 5/2001 | Goss | 700/95 |
| 6,308,161 B1 | 10/2001 | Boden et al. | |
| 6,336,053 B1 * | 1/2002 | Beatty | 700/108 |
| 6,523,045 B1 * | 2/2003 | Beatty | 700/108 |
| 6,801,819 B1 | 10/2004 | Barto et al. | |
| 6,804,575 B2 * | 10/2004 | Sagawa et al. | 700/179 |
| 6,907,312 B2 * | 6/2005 | Sagawa et al. | 700/180 |
| 6,907,313 B2 * | 6/2005 | Matthews et al. | 700/182 |
| 7,043,315 B2 | 5/2006 | Litao | |
| 7,103,433 B1 * | 9/2006 | Yuan et al. | 700/95 |
| 7,181,310 B2 * | 2/2007 | Huang et al. | 700/169 |
| 7,228,196 B2 * | 6/2007 | Dai et al. | 700/173 |
| 7,266,476 B2 * | 9/2007 | Coburn et al. | 702/183 |
| 7,343,212 B1 * | 3/2008 | Brearley et al. | 700/99 |
| 7,376,483 B2 | 5/2008 | Baumgartner | |
| 2004/0117046 A1 | 6/2004 | Colle et al. | |
| 2004/0167652 A1 | 8/2004 | Ishii | |
| 2005/0234577 A1 | 10/2005 | Loughran et al. | |
| 2007/0055638 A1 | 3/2007 | Kaup et al. | |

OTHER PUBLICATIONS http://www.3ds.com/corporate/about-us/brands/delmia/ (Mar. 14, 2006).
http://www.ugs.com/products/technomatix/ (Apr. 28, 2006).

* cited by examiner

Primary Examiner—Charles R Kasenge
(74) Attorney, Agent, or Firm—Raymond L. Coppiellie; Brook Kushman P.C.

(57) ABSTRACT

Systems and methods to select a tool are provided. In at least one embodiment, a system receives first tool data defining a first tool and requirement data defining a requirement of a process to be performed within a manufacturing facility. The system stores the first tool data in memory. The system automatically determines whether the first tool data satisfies a selected requirement definition and outputs a first representation of the first tool if the first tool data satisfies the selected requirement definition thereby enabling a user to select the tool.

11 Claims, 9 Drawing Sheets

Fig. 1

| COMPONENT DATA 18 | | CONFIGURATION DATA 14 | | | CATEGORY DATA 16 | |
|---|---|---|---|---|---|---|
| PART NUMBER 34 | DESCRIPTION 36 | TRIM LEVEL INDICATOR 26 | MODEL INDICATOR 30 | DESCRIPTION 29 | POSITION INDICATOR 32 | TYPE |
| 53X261 | 15" X 6" WHEEL | LOW-LINE | SEDAN | WHEEL | FRONT/REAR | STEEL |
| 53X981 | P245/35R15 TIRE | LOW-LINE | SEDAN | TIRE | FRONT/REAR | N/A |
| 53X982 | P245/35R20 TIRE | HIGH-LINE/ LOW-LINE | COUPE | TIRE | REAR | N/A |
| 36Y283 | 3/4" NUT | LOW-LINE | SEDAN/COUPE | NUT | FRONT/REAR | N/A |

TOOL DATA 20

| DESCRIPTION 42d | LOCATED IN PLANT 42a | LOCATION OF TOOL 42b | TORQUE 42c | RUNNER LENGTH 42e |
|---|---|---|---|---|
| NUT RUNNER XYZ BRAND | NO | | 10-35 ft-lbs | 6" |
| NUT RUNNER ABC BRAND | YES | CELL 23 | 25-40 ft-lbs | 5" |
| NUT RUNNER ABC BRAND | YES | CELL 40 | 20-50 ft-lbs | 5" |
| NUT RUNNER ABC BRAND | YES | CELL 35 | 30-40 ft-lbs | 5" |

| PROCESS DATA 22 | | | |
|---|---|---|---|
| DESCRIPTION 44 | REQUIREMENT DATA 24 | | |
| | FIRST REQUIREMENT 24a | SECOND REQUIREMENT 24b | THIRD REQUIREMENT 24c |
| ASSEMBLE WHEEL TO VEHICLE 46 | 37 ft-lbs TORQUE | 5" RUNNER LENGTH | ABC BRAND |

Fig. 4

| PROCESS DATA 22 | CATEGORY DATA 16 |
|---|---|
| ASSEMBLE WHEEL TO VEHICLE 46 | WHEEL |
| | NUT |
| | HUB |

TOOL SELECTION SYSTEM AND METHOD

BACKGROUND OF THE INVENTION

1. Field of the Invention

The invention relates to tool selection systems and methods.

2. Background

Planning for the assembly of a vehicle within a manufacturing facility may involve identifying tools to be used during a process. Software may assist with this task. Current software, such as those from Dassault Systems Inc. and UGS, allows a user to manually pick a tool from a list and assign it to a process. For example, the user may assign "XYZ nut runner, 10-35 ft.-lbs., 6" runner length" to the process "attach wheel to vehicle." The user identifies the tool to be assigned based on the user's knowledge of the process and the listed capabilities of the tool. Manually identifying tools, however, may be time consuming and inefficient because of the number of tools needed to assemble a vehicle and the user's potentially limited knowledge of the tools within the manufacturing facility.

SUMMARY

In at least one embodiment, the invention takes the form of a computer-implemented tool selection system. The system receives first tool data defining a first tool and requirement data defining a requirement of a process to be performed within a manufacturing facility. The system stores the first tool data in memory. The system automatically determines whether the first tool data satisfies a selected requirement definition and outputs a first representation of the first tool if the first tool data satisfies the selected requirement definition thereby enabling the user to select the tool.

In at least one embodiment, the invention takes the form of a tool selection method. The method includes receiving first tool data defining a first tool and requirement data defining a requirement of a process to be performed within a manufacturing facility. The method also includes storing the first tool data in memory. The method further includes automatically determining whether the first tool data satisfies a selected requirement definition and outputting a first representation of the first tool if the first tool data satisfies the selected requirement definition thereby enabling the user to select the tool.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIGS. 6a-6h show screens in accordance with an embodiment of the invention.

DETAILED DESCRIPTION

Figure 1:
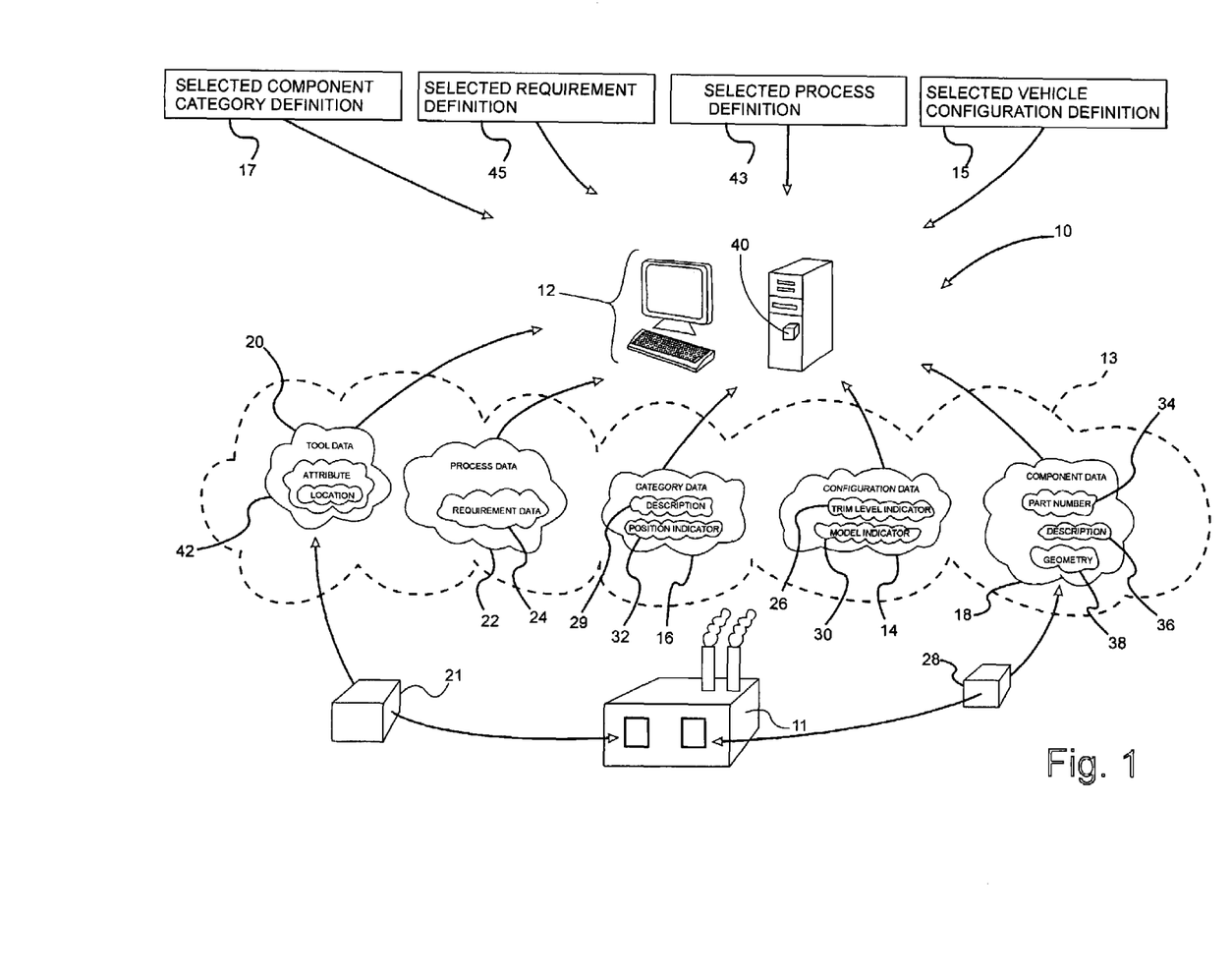
FIG. 1 shows a system in accordance with an embodiment of the invention.

FIG. 1 shows computer-implemented component selection system 10 for manufacturing facility 11. System 10 includes computer 12 configured to receive several types of data 13. Data 13 may be input in any desired fashion including via keyboard or loaded from storage media. Data 13 may include configuration data 14, category data 16, and component data 18. Data 13 may also include tool data 20, process data 22, and requirement data 24. Configuration data 14, category data 16, and component data 18 need not be input simultaneously. Similarly, tool data 20, process data 22, and requirement data 24 need not be input simultaneously.

Configuration data 14 defines vehicle assembly configurations to be assembled within manufacturing facility 11. Vehicle assembly configurations may include an entire vehicle. Vehicle assembly configurations may also include only portions of a vehicle, e.g., engine and seat. Configuration data 14 is associated with component data 18 as will be explained in detail below. Configuration data 14 may be used by system 10 to determine whether vehicle components 28, i.e., 28a-28n, satisfy selected vehicle configuration definition 15 as will be explained in detail below. Configuration data 14 may define a trim level, e.g., low-line or high-line, a preferred package of options, e.g., stick shift and spoiler, or a model, e.g., sedan or coupe. Configuration data 14 may define any desired vehicle configuration.

Configuration data 14 may include trim level indicator 26 that may be used by system 10 to determine whether, for example, vehicle component 28a, e.g., a 15"×6" wheel, is used in a low-line trim package of a vehicle. For example, if a user of system 10 selects the low-line as vehicle configuration definition 15, as will be explained in detail below, system 10 may automatically select the 15"×6" wheel.

Configuration data 14 may include model indicator 30 that may be used by system 10 to determine whether, for example, vehicle component 28a, e.g., a 15"×6" wheel, is used in a sedan model of a vehicle. For example, if a user of system 10 selects sedan as vehicle configuration definition 15, as will be explained in detail below, system 10 may automatically select the 15"×6" wheel.

Category data 16 defines component categories. Category data 16 is associated with component data 18 as will be explained in detail below. Category data 16 may be used by system 10 to determine whether vehicle component 28 satisfies selected component category definition 17 as will be explained in detail below. Examples of component category descriptions 29 include wheels, tires, doors, and fenders.

Category data 16 may include vehicle position indicator 32 that may be used by system 10 to determine whether, for example, vehicle component 28a, e.g., a 15"×6" wheel, is used on the front of a vehicle. For example, if a user of system 10 selects wheels and rear as component category definition 17, as will be explained in detail below, system 10 may automatically select the 15"×6" wheel.

Component data 18 defines vehicle components 28. Component data 18 may include information found on an engineering bill of materials, e.g., part number 34, part description 36. Component data 18 may also include component geometry 38, or mathematical data, used to generate a computer model of vehicle component 28.

Tool data 20 defines tools 21, i.e., 21a-21n. Tool data 20 may include attributes 42, i.e., 42a-42n. Attributes 42 may be used by system 10 to determine whether tool 21 satisfies selected process definition 43 or selected requirement definition 45 as will be explained in detail below.

Process data 22 defines a process for assembling at least a portion of a vehicle in manufacturing facility 11. Process data 22 may include requirement data 24, i.e., one or more requirements 24a-24n, defining a requirement of the process to be performed within manufacturing facility 11.

System 10 stores configuration data 14, category data 16, and component data 18 in memory 40 in a database. System 10 stores tool data 20, process data 22, and requirement data 24 in memory 40 in a database. Data 13, however, may be stored in any manner.

Figure 2:
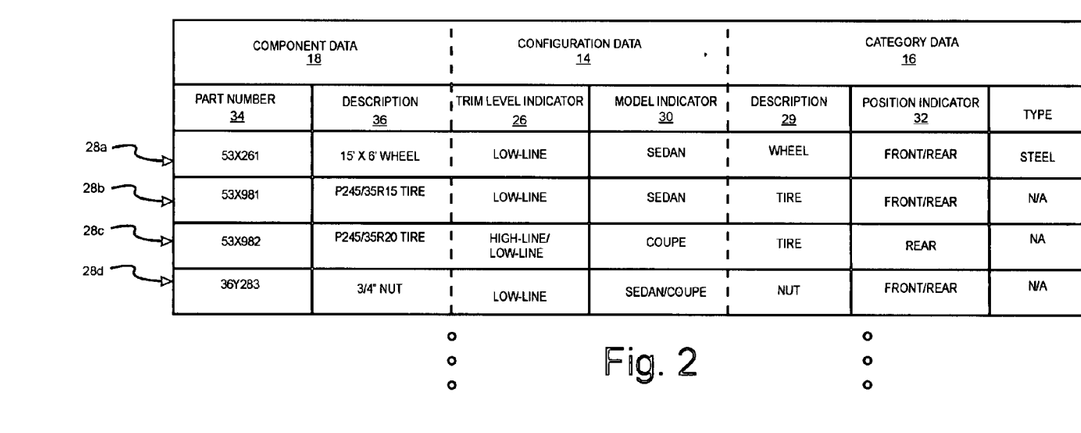
FIG. 2 shows data in accordance with an embodiment of the invention.

FIG. 2 shows an association between configuration data 14, category data 16, and component data 18 within memory 40. Data 13 that appear in a particular row are associated together.

Figure 3:
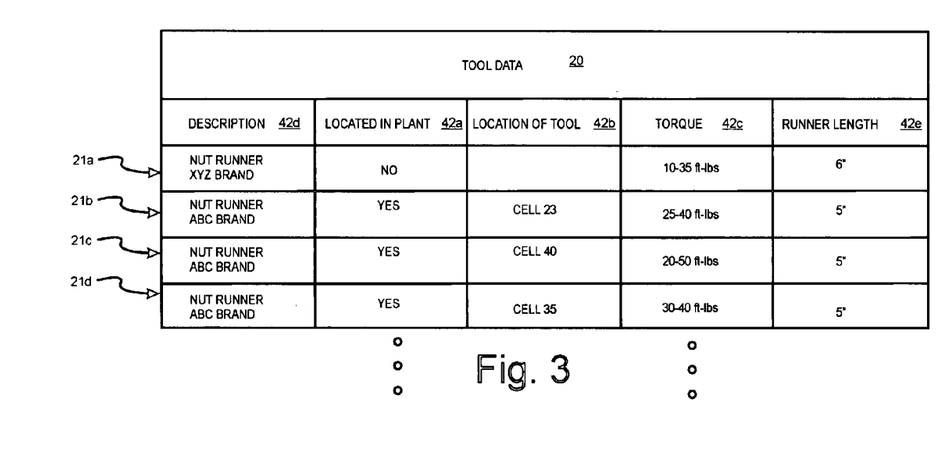
FIG. 3 shows data in accordance with an embodiment of the invention.

FIG. 3 shows an example set of tool data 20. Attribute 42a indicates that tool 21, i.e., 21a-21n, is located within manufacturing facility 11. Attribute 42b indicates the location of tool 21 within manufacturing facility 11. Attribute 42c indicates, in this example, the maximum torque tool 21 can apply to a nut. Attribute 42d describes tool 21 and identifies its manufacturer. Attributes 42 may indicate any desired characteristic or capability of tool 21.

Figure 4:
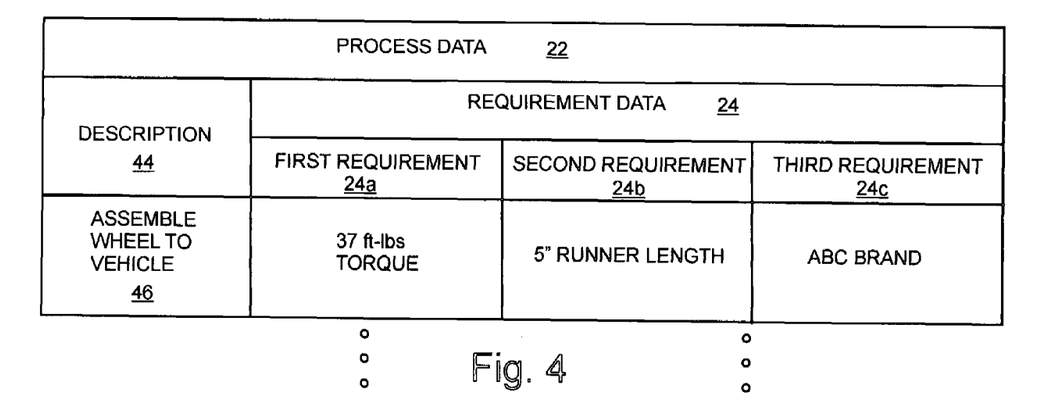
FIG. 4 shows data in accordance with an embodiment of the invention.

FIG. 4 shows an example set of process data 22. Process data 22 includes description 44 of particular process 46, e.g., assemble wheel to vehicle. First Requirement 24a specifies the amount of torque required. Second Requirement 24b specifies the desired runner length of tool 21. Third Requirement 24c specifies the desired manufacturer of tool 21. As explained above, there may be any number of requirements 24.

Figure 5:
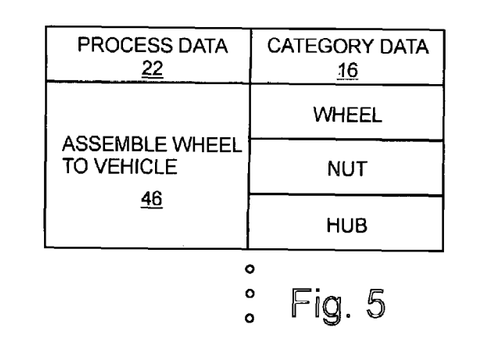
FIG. 5 shows data in accordance with an embodiment of the invention.
Figure 6A:
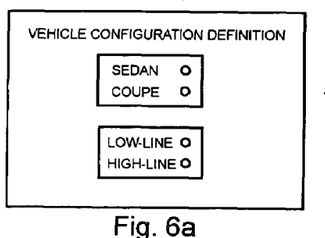
Figure 6B:
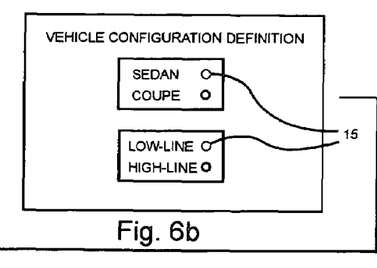
Figure 6C:
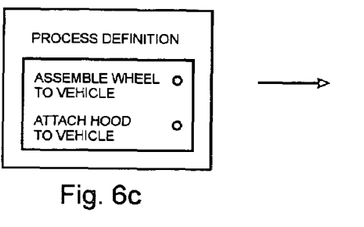
Figure 6D:
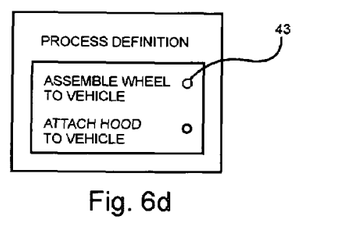
Figure 6E:
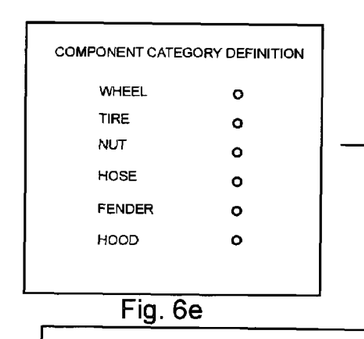
Figure 6F:
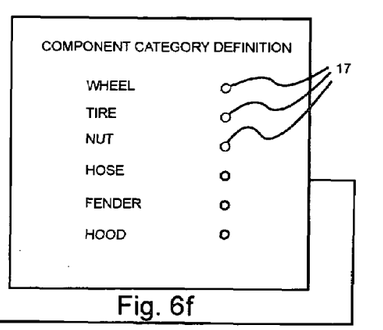
Figure 6G:
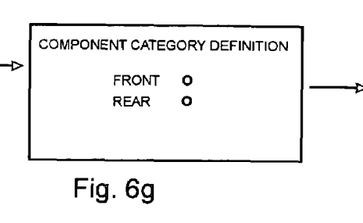
Figure 6H:
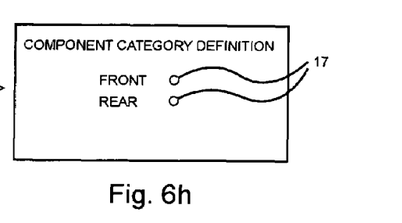

FIG. 5 shows that certain of category data 16 may be associated with process data 22. System 10 is thus informed as to which component categories are used during a process. For example, the process "assemble wheel to vehicle" uses component categories "wheel, nut, and hub."

FIGS. 2 and 5 illustrate an association between different types of data 13. The tabular format used in FIGS. 2 and 5, however, is for illustration purposes and does not necessarily suggest that data 13 of FIGS. 2 and 5 are associated or stored in such a tabular format. Data 13 of FIGS. 2 and 5 may be associated together using any desired technique. For example, Data 13 may be manually associated together, data 13 may be associated together using an algorithm, or data 13 may be associated together before it is received by system 10.

FIGS. 6a, 6b, 6c, and 6d show a series of screen shots of system 10 permitting a user to select vehicle configuration definition 15 and process definition 43. Once vehicle configuration definition 15, e.g., sedan and low-line, and process definition 43, e.g., assemble wheel to vehicle, are selected, computer 12 automatically determines whether component data 18 satisfies selected vehicle configuration definition 15 and automatically determines whether component data 18 satisfies selected component category definition 17.

In the example of FIGS. 6a, 6b, 6c, and 6d, component category definition 17 was implicitly selected by selecting process definition 43 because of the association between process data 22 and category data 16 as illustrated in FIG. 5 as will be explained in detail below.

FIGS. 6e, 6f, 6g, and 6h show a series of screen shots of system 10 in an alternative embodiment permitting a user to explicitly select component category definition 17.

In the embodiment of FIGS. 6e, 6f, 6g, and 6h, computer 12 may automatically determine whether component data 18 satisfies selected component category definition 17 based on, for example, vehicle position indicator 32 as will be explained below.

Figure 7:
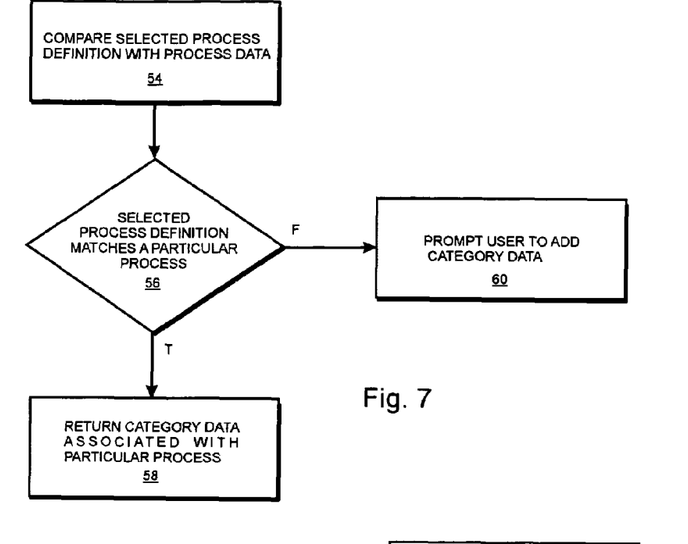
FIG. 7 shows an algorithm in accordance with an embodiment of the invention.

FIG. 7 shows an example algorithm used to select component category definition 17 based on selected process definition 43. At step 54, computer 12 compares selected process definition 43 with process data 22. At step 56, computer 12 determines the logical correctness of the statement: selected process definition 43 matches particular process 46. If true, at step 58, computer 12 returns category data 16 associated with particular process 46. If false, at step 60, computer 12 may prompt the user to add category data 16.

Figure 8:
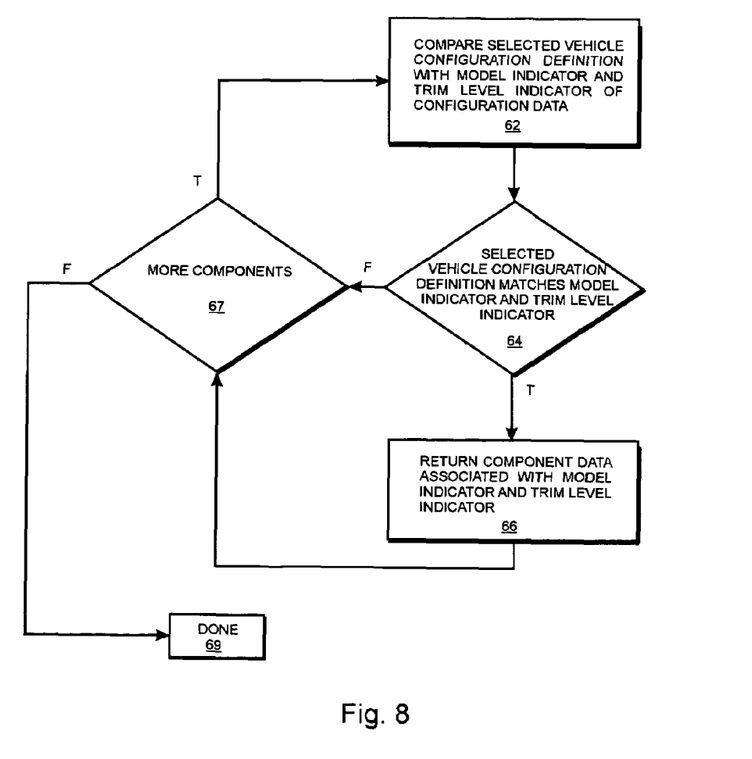
FIG. 8 shows an algorithm in accordance with an embodiment of the invention.

FIG. 8 shows an example algorithm used to automatically determine whether component data 18 satisfies selected vehicle configuration definition 15 and selected component category definition 17. At step 62, computer 12 compares selected vehicle configuration definition 15, e.g., sedan and low-line, with model indicator 30 and trim level indicator 26 associated with component 28x of component data 18. At step 64, computer 12 determines the logical correctness of the statement: selected vehicle configuration definition 15 matches model indicator 30 and trim level indicator 26. If true, at step 66, computer 12 returns component data 18 associated with model indicator 30 and trim level indicator 26. At step 67, computer 12 determines whether there are more components, e.g., component 28x+1. If true, computer 12 returns to step 62. If false, at step 69, the algorithm is complete. Returning to step 64, if false, computer 12 determines whether there are more components, e.g., component 28x+1. If true, computer 12 returns to step 62. If false, at step 69, the algorithm is complete. Computer 12 performs this algorithm for each component 28, i.e., 28a-28n.

The computer 12 may automatically determine whether component data 18 satisfies selected component category definition 17 based on vehicle position indicator 32 using algorithms similar to those of FIGS. 7 and 8.

Figure 9:
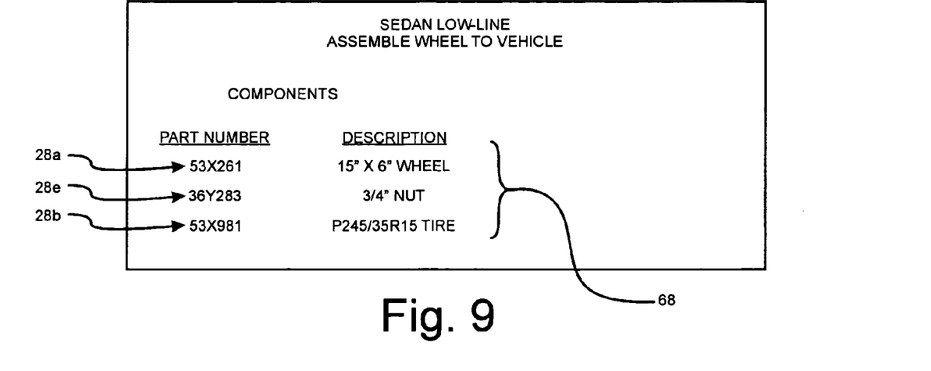
FIG. 9 shows a screen in accordance with an embodiment of the invention.

FIG. 9 shows output 68 representing vehicle components 28, e.g., 28a, 28b, and 28e, selected as a result of computer 12 performing the algorithms of FIGS. 7 and 8. Output 68 includes alpha-numeric characters. Output 68, however, may take any desired form. Output 68 may be in electronic or hard copy format. In the embodiment of FIG. 9, output 68 appears on a display screen.

Figure 10:
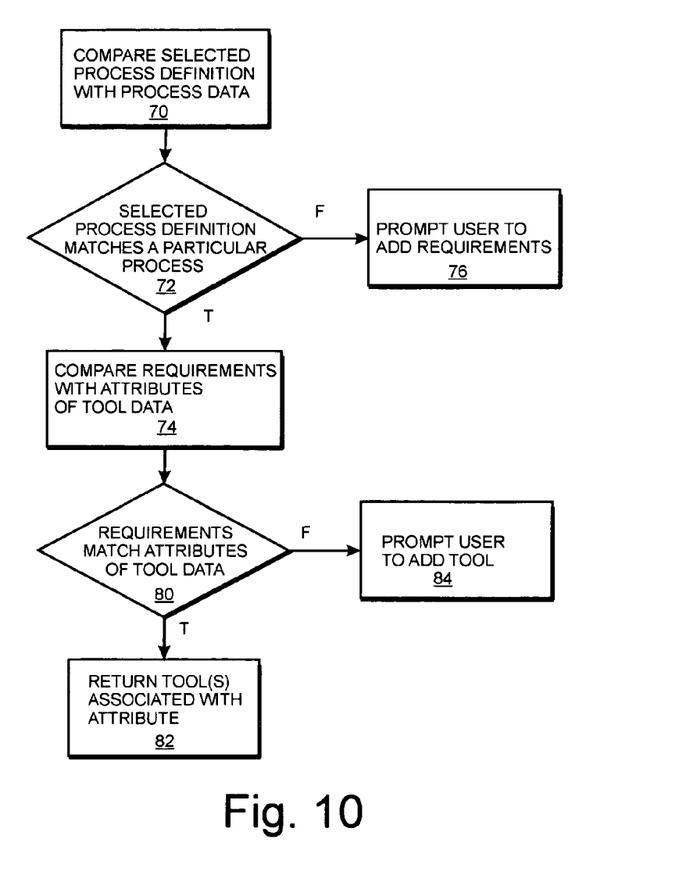
FIG. 10 shows an algorithm in accordance with an embodiment of the invention.

FIG. 10 shows an example algorithm used to automatically determine whether tool data 20 satisfies selected process definition 43. At step 70, computer 12 compares selected process definition 43 with process data 22. At step 72, computer 12 determines the logical correctness of the statement: selected process definition 43 matches particular process 46. If true, at step 74 computer 12 compares requirements 24 associated with particular process 46 with attributes 42 of tool data 20. As such, requirement definition 45 is implicitly selected. Requirement definition 45 may be explicitly selected in a manner similar to that explained with reference to FIGS. 6e, 6f, 6g, and 6h. If false, at step 76, computer 12 may prompt the user to add requirements 24. At step 80, computer 12 determines the logical correctness of the statement: requirement definition 45 matches attributes 42 of tool data 20. If true, at step 82, computer 12 returns tool 21, e.g., 28x of 28a-28n, associated with attributes 42. If false, at step 84, computer 12 may prompt the user to add a tool.

Figure 11:
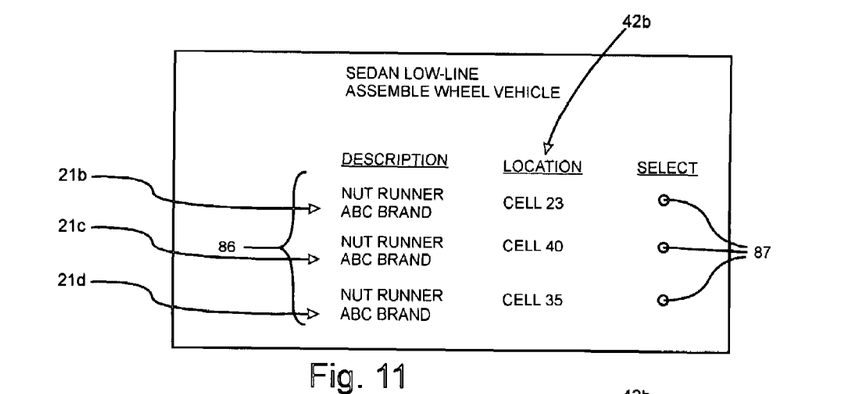
FIG. 11 shows a screen in accordance with an embodiment of the invention.
Figure 12:
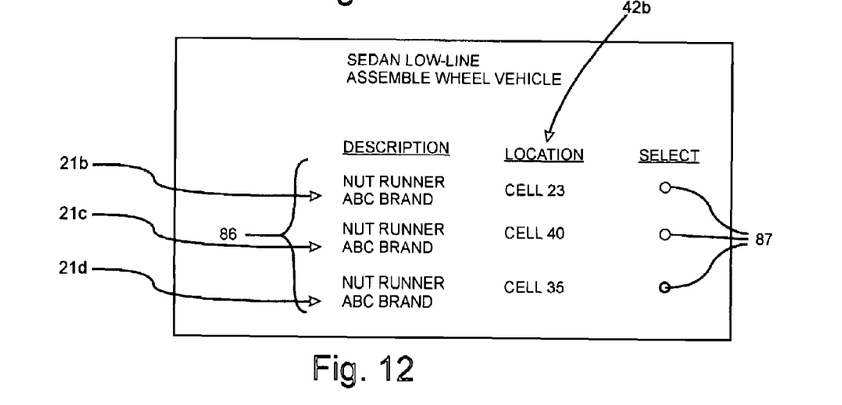
FIG. 12 shows a screen in accordance with an embodiment of the invention.

FIGS. 11 and 12 show output 86 representing tools 21, e.g., 21b, 21c, and 21d, as a result of computer 12 performing the algorithm of FIG. 10. Output 86 includes alpha-numeric characters. Output 86, however, may take any form. Output 86 may be in electronic or hard copy format. In the embodiment of FIG. 11, output 86 appears on a display screen.

Output 86 may indicate tool location 42b. Output 86 also permits the user to select one or more tools 21, e.g., 21b and 21c, by selecting fields 87. FIG. 12 shows two of fields 87 selected. Tools 21, however, may be selected in any desired fashion. Selected tools 21 may be stored in memory 40 using any desired technique. Output 68 of FIG. 9 may also be shown simultaneously with output 86 of FIG. 11.

Figure 13A:
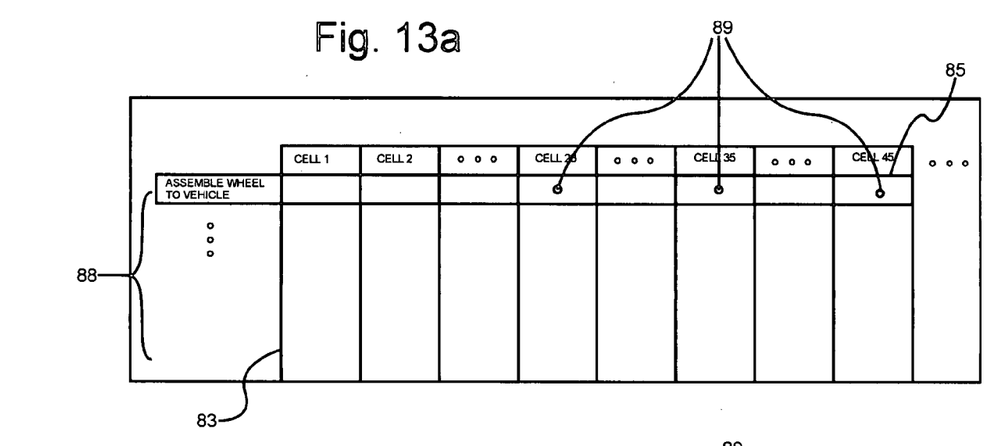
FIGS. 13a-13b show screens in accordance with an embodiment of the invention.

FIG. 13a shows an alternative embodiment of output 86. FIG. 13a shows a spreadsheet including grid 88 listing the processes to be performed in manufacturing facility 11 on y-axis 83, e.g., assemble wheel to vehicle, and the locations of all the work cells within manufacturing facility 11 along x-axis 85, e.g., cell 1, cell 2, etc. In the embodiment of FIG. 13a, x-axis 85 is generally perpendicular to y-axis 83. Empty circles 89 in each of location cells 23, 35, and 45 indicate the locations within manufacturing facility 11 where tool 21 satisfies selected process definition 43.

Figure 13B:
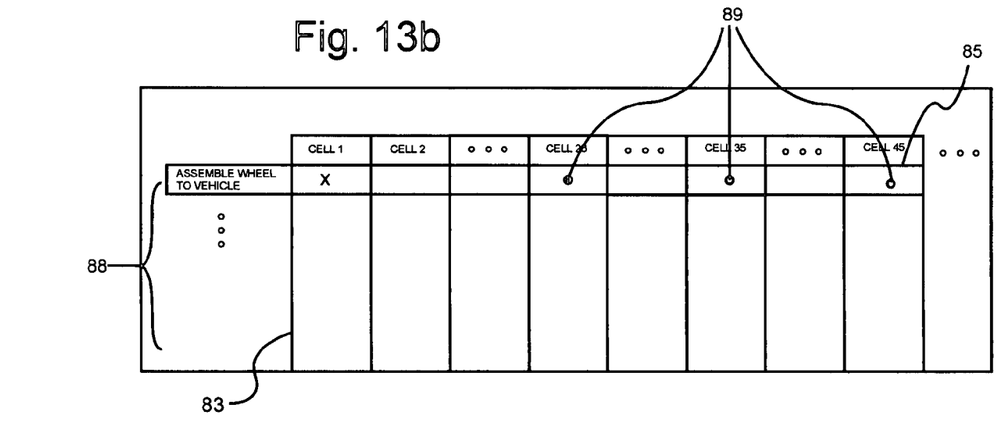

FIG. 13b shows that a user is able select empty circle 89 to indicate where the process is currently being performed, e.g., cell 23. The user may, for example select one of circles 89 with a mouse click. The user is also able to indicate desired location 85 to perform the process within manufacturing facility 11, e.g., the "X" in cell 1. The user may, for example, type an "X" directly in the field of interest.

Figure 14:
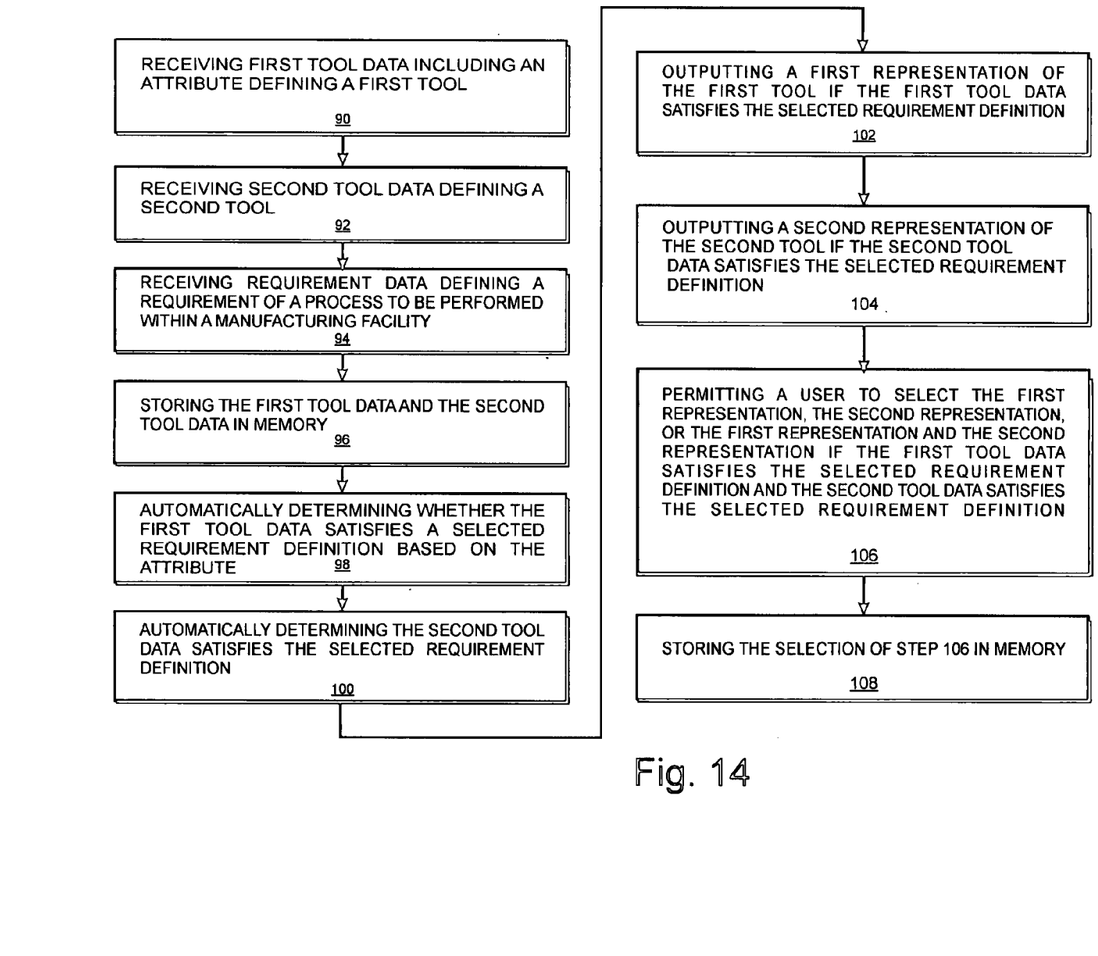
FIG. 14 shows a method in accordance with the invention.

FIG. 14 shows a tool selection method. At step 90, first tool data including an attribute defining a first tool is received. At step 92, second tool data defining a second tool is received. At step 94, requirement data defining a requirement of a process to be performed within a manufacturing facility is received.

At step 96, the first tool data and the second tool data are stored in memory. At step 98, a determination is automatically made as to whether the first tool data satisfies a selected requirement definition based on the attribute. At step 100, a determination is automatically made as to whether the second tool data satisfies the selected requirement definition. At step 102, a first representation of the first tool is output if the first tool data satisfies the selected requirement definition. At step 104, a second representation of the second tool is output if the second tool data satisfies the selected requirement definition. At step 106, a user is permitted to select the first representation, the second representation, or the first representation and the second representation if the first tool data satisfies the selected requirement definition and the second tool data satisfies the selected requirement definition. At step 108, the selection of step 106 is stored in memory.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A computer-implemented tool selection system comprising:
   a computer configured to
   receive first tool data defining a first tool, wherein the first tool data includes an attribute,
   receive requirement data defining a requirement of a process to be performed within a manufacturing facility, wherein the attribute includes information indicative of the tool's current location in relation to the manufacturing facility,
   store the first tool data in memory,
   automatically determine whether the first tool data satisfies a selected requirement definition that defines a requirement of a process to be performed within the manufacturing facility based on the attribute,
   output a first representation of the first tool including the tool's current location in relation to the manufacturing facility if the first tool data satisfies the selected requirement definition to enable a user to select the tool,
   receive input selecting the first representation, and
   store the selection in the memory in response to receiving the input selecting the first representation.

2. The system of claim 1 wherein the computer is further configured to receive second tool data defining a second tool, store the second tool data in memory, automatically determine whether the second tool data satisfies the selected requirement definition, and output a second representation of the second tool if the second tool data satisfies the selected requirement definition.

3. The system of claim 2 wherein the computer is further configured to permit a user to select the first representation, the second representation, or the first representation and the second representation if the first tool data meets the selected requirement definition and the second tool data meets the selected requirement definition, and to store the selection in the memory.

4. The system of claim 1 wherein the attribute indicates whether the tool is located in the manufacturing facility.

5. The system of claim 1 wherein the first representation is in an electronic or hard copy format.

6. A tool selection method comprising:
- receiving first tool data defining a first tool, wherein the first tool data includes an attribute;
- receiving requirement data defining a requirement of a process to be performed within a manufacturing facility, wherein the attribute includes information indicative of the tool's current location in relation to the manufacturing facility;
- storing the first tool data in memory;
- automatically determining whether the first tool data satisfies a selected requirement definition that defines a requirement of a process to be performed within the manufacturing facility based on the attribute;
- outputting a first representation of the first tool including the tool's current location in relation to the manufacturing facility if the first tool data satisfies the selected requirement definition to enable a user to select the tool;
- receiving input selecting the first representation; and
- storing the selection in the memory in response to receiving the input selecting the first representation.

7. The method of claim 6 wherein the method further comprises receiving second tool data defining a second tool, storing the second tool data in memory, automatically determining whether the second tool data satisfies the selected requirement definition, and outputting a second representation of the second tool if the second tool data satisfies the selected requirement definition.

8. The method of claim 7 wherein the method further comprises permitting a user to select the first representation, the second representation, or the first representation and the second representation if the first tool data satisfies the selected requirement definition and the second tool data satisfies the selected requirement definition, and storing the selection in the memory.

9. The method of claim 6 wherein the attribute indicates whether the tool is located in the manufacturing facility.

10. The method of claim 6 wherein the first representation indicates the first tool's location within the manufacturing facility.

11. The method of claim 6 wherein the first representation is in an electronic or hard copy format.

* * * * *